US011314416B1

(12) United States Patent
Shveidel et al.

(10) Patent No.: US 11,314,416 B1
(45) Date of Patent: Apr. 26, 2022

(54) DEFRAGMENTATION OF STRIPED VOLUME IN DATA STORAGE SYSTEM

(71) Applicant: EMC IP Holding Company LLC, Hopkinton, MA (US)

(72) Inventors: Vladimir Shveidel, Pardes-Hana (IL); Lior Kamran, Rishon LeZion (IL)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/078,837

(22) Filed: Oct. 23, 2020

(51) Int. Cl.
*G06F 3/06* (2006.01)

(52) U.S. Cl.
CPC .......... *G06F 3/0611* (2013.01); *G06F 3/0613* (2013.01); *G06F 3/0632* (2013.01); *G06F 3/0653* (2013.01); *G06F 3/0689* (2013.01)

(58) Field of Classification Search
None
See application file for complete search history.

(56) References Cited

U.S. PATENT DOCUMENTS

| 7,165,155 | B1 | 1/2007 | Duprey et al. |
| 7,440,982 | B2 | 10/2008 | Lu et al. |
| 7,444,464 | B2 | 10/2008 | Urmston et al. |
| 8,095,726 | B1 | 1/2012 | O'Connell et al. |
| 8,214,612 | B1 | 7/2012 | Natanzon |
| 8,301,593 | B2 | 10/2012 | Hoffmann et al. |
| 8,335,899 | B1 | 12/2012 | Meiri et al. |
| 9,104,326 | B2 | 8/2015 | Frank et al. |
| 9,208,162 | B1 | 12/2015 | Hallak et al. |
| 9,286,003 | B1 | 3/2016 | Hallak et al. |

(Continued)

FOREIGN PATENT DOCUMENTS

WO 2016111954 A1 7/2016
WO PCT/US2019/024885 1/2020
(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Michael Alsip
(74) *Attorney, Agent, or Firm* — Ryan, Mason & Lewis, LLP

(57) ABSTRACT

A storage control system generates a striped storage volume in an array of data storage devices. The striped storage volume includes multiple stripe sets, each associated with a different stripe type, and each having stripes that are assigned the stripe type associated with the stripe set. The stripe type represents a block size of the stripes included in the stripe set. A background stripe defragmentation process is performed to defragment stripes in a target stripe set and generate empty stripes. The empty stripes generated by the background stripe defragmentation process are added into an empty stripe set of the striped storage volume. The empty stripes in the empty stripe set have unassigned stripe types. A stripe type is assigned to an empty stripe in the empty stripe which is selected for removal and inclusion in the stripe set associated with the stripe type assigned to the empty stripe.

20 Claims, 8 Drawing Sheets

(56) References Cited

U.S. PATENT DOCUMENTS

| | | | |
|---|---|---|---|
| 9,514,014 | B2 | 12/2016 | Webman et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,891,994 | B1 | 2/2018 | Schneider et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,365,827 | B1 | 7/2019 | Satish et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,496,324 | B2 | 12/2019 | Meiri et al. |
| 10,496,330 | B1 * | 12/2019 | Bernat .................. G06F 3/0659 |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 10,592,159 | B2 | 3/2020 | Kucherov et al. |
| 10,592,161 | B1 | 3/2020 | Chen et al. |
| 10,606,519 | B1 | 3/2020 | Shveidel |
| 10,635,533 | B2 | 4/2020 | Schneider et al. |
| 10,684,915 | B2 | 6/2020 | Schneider et al. |
| 10,691,355 | B2 | 6/2020 | Kucherov et al. |
| 10,691,373 | B2 | 6/2020 | Harduf et al. |
| 10,691,551 | B2 | 6/2020 | Meiri et al. |
| 10,698,772 | B2 | 6/2020 | Hu et al. |
| 10,705,965 | B2 | 7/2020 | Shveidel et al. |
| 10,719,253 | B2 | 7/2020 | Alkalay et al. |
| 10,725,855 | B2 | 7/2020 | Shani et al. |
| 10,754,559 | B1 | 8/2020 | Meiri et al. |
| 10,754,575 | B2 | 8/2020 | Stronge |
| 10,754,736 | B2 | 8/2020 | Shani et al. |
| 10,761,933 | B2 | 9/2020 | Moore et al. |
| 10,783,038 | B2 | 9/2020 | Moore et al. |
| 2007/0022121 | A1 | 1/2007 | Bahar et al. |
| 2008/0279462 | A1 | 11/2008 | Celi, Jr. |
| 2009/0132955 | A1 | 5/2009 | Garg et al. |
| 2009/0276593 | A1 | 11/2009 | Jacobson et al. |
| 2010/0179941 | A1 | 7/2010 | Agrawal et al. |
| 2011/0022566 | A1 | 1/2011 | Beaverson et al. |
| 2011/0225123 | A1 | 9/2011 | D'Souza et al. |
| 2012/0124282 | A1 | 5/2012 | Frank et al. |
| 2012/0265933 | A1 * | 10/2012 | Gupta .................. G06F 3/0608 711/114 |
| 2013/0305002 | A1 | 11/2013 | Hallak et al. |
| 2013/0325824 | A1 | 12/2013 | Shoens |
| 2014/0181016 | A1 | 6/2014 | Whitehead et al. |
| 2014/0244935 | A1 | 8/2014 | Ezra et al. |
| 2015/0378766 | A1 | 12/2015 | Beveridge et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0345207 | A1 | 11/2016 | Kwak et al. |
| 2016/0350214 | A1 * | 12/2016 | Payer .................. G06F 9/4843 |
| 2017/0075842 | A1 | 3/2017 | Su et al. |
| 2017/0123686 | A1 * | 5/2017 | Pinto .................. G06F 3/0652 |
| 2017/0185529 | A1 | 6/2017 | Chhabra et al. |
| 2017/0192857 | A1 | 7/2017 | Meiri et al. |
| 2018/0095873 | A1 | 4/2018 | Nakagoe et al. |
| 2018/0239671 | A1 * | 8/2018 | Wei .................. G06F 3/0647 |
| 2019/0303490 | A1 | 10/2019 | Chen et al. |
| 2019/0370354 | A1 | 12/2019 | Kucherov et al. |
| 2019/0370355 | A1 | 12/2019 | Kucherov et al. |
| 2019/0370356 | A1 | 12/2019 | Kucherov et al. |
| 2019/0370357 | A1 | 12/2019 | Kucherov et al. |
| 2019/0391746 | A1 * | 12/2019 | Papandreou .......... G06F 3/0665 |
| 2019/0392060 | A1 | 12/2019 | Meiri et al. |
| 2020/0026616 | A1 | 1/2020 | Hu et al. |
| 2020/0097174 | A1 | 3/2020 | Moore et al. |
| 2020/0097363 | A1 | 3/2020 | Moore et al. |
| 2020/0097393 | A1 | 3/2020 | Moore et al. |
| 2020/0125276 | A1 | 4/2020 | Shani et al. |
| 2020/0218601 | A1 | 7/2020 | Schneider et al. |
| 2020/0218610 | A1 | 7/2020 | Schneider et al. |
| 2020/0225849 | A1 | 7/2020 | Meiri et al. |
| 2020/0226023 | A1 | 7/2020 | Meiri |
| 2020/0226145 | A1 | 7/2020 | Meiri |
| 2020/0233704 | A1 | 7/2020 | Alkalay et al. |
| 2020/0233705 | A1 | 7/2020 | Alkalay et al. |
| 2020/0233881 | A1 | 7/2020 | Harduf et al. |
| 2020/0241785 | A1 | 7/2020 | Kamran et al. |
| 2020/0242130 | A1 | 7/2020 | Chen et al. |
| 2020/0249868 | A1 | 8/2020 | Glimcher et al. |
| 2020/0249869 | A1 | 8/2020 | Glimcher et al. |
| 2020/0250089 | A1 | 8/2020 | Kamran et al. |
| 2020/0250144 | A1 | 8/2020 | Natanzon et al. |
| 2020/0272542 | A1 | 8/2020 | Meiri et al. |
| 2020/0272600 | A1 | 8/2020 | Natanzon et al. |
| 2020/0285268 | A1 | 9/2020 | Meiri et al. |
| 2020/0285402 | A1 | 9/2020 | Meiri et al. |
| 2020/0301784 | A1 | 9/2020 | Chen |
| 2020/0310649 | A1 | 10/2020 | Chen et al. |
| 2020/0310654 | A1 | 10/2020 | Meiri et al. |
| 2020/0326877 | A1 | 10/2020 | Chen et al. |
| 2020/0327024 | A1 | 10/2020 | Alkalay et al. |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/662,708 filed in the name of Xiangping Chen et al. Jul. 28, 2017, and entitled "Token-Based Data Flow Control in a Clustered Storage System."

U.S. Appl. No. 15/793,121 filed in the name of David Meiri et al. Oct. 25, 2017, and entitled "Opportunistic Compression of Replicated Data in a Content Addressable Storage System."

U.S. Appl. No. 15/824,536 filed in the name of Christopher Sayles et al. Nov. 28, 2017, and entitled "Storage System with Asynchronous Messaging between Processing Modules for Data Replication."

(56) References Cited

OTHER PUBLICATIONS

U.S. Appl. No. 16/343,942 filed in the name of Yonatan Shtarkman et al. Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. Apr. 22, 2019, and entitled "Snapshot-Enabled Storage System Implementing Algorithm for Efficient Reading of Data from Stored Snapshots."

U.S. Appl. No. 16/396,897 filed in the name of Anton Kucherov et al. Apr. 29, 2019, and entitled "Storage System with Deduplication-Aware Replication Implemented Using a Standard Storage Command Protocol."

U.S. Appl. No. 16/413,050 filed in the name of Xiangping Chen et al. May 15, 2019, and entitled "Storage System with Coordinated Recovery across Multiple Input-Output Journals of Different Types."

U.S. Appl. No. 16/530,121 filed in the name of Anton Kucherov et al. Aug. 2, 2019, and entitled "Memory-Efficient Processing of Raid Metadata Bitmaps."

U.S. Appl. No. 16/663,524 filed in the name of Xiangping Chen et al. Oct. 25, 2019, and entitled "Storage System with Throughput-Based Timing of Synchronous Replication Recovery."

U.S. Appl. No. 16/665,651 filed in the name of Lior Kamran et al. Oct. 28, 2019, and entitled "Recovery Flow with Reduced Address Lock Contention in a Content Addressable Storage System."

U.S. Appl. No. 16/671,824 filed in the name of Lior Kamran et al. Nov. 1, 2019, and entitled "Storage System Capacity Expansion Using Mixed-Capacity Storage Devices."

U.S. Appl. No. 16/693,858, filed in the name of Doron Tai Nov. 25, 2019, and entitled "Storage System with Prioritized RAID Rebuild."

\* cited by examiner

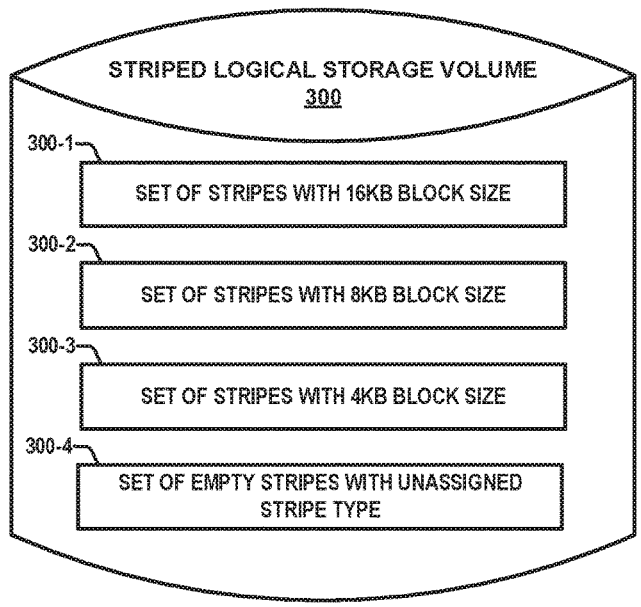
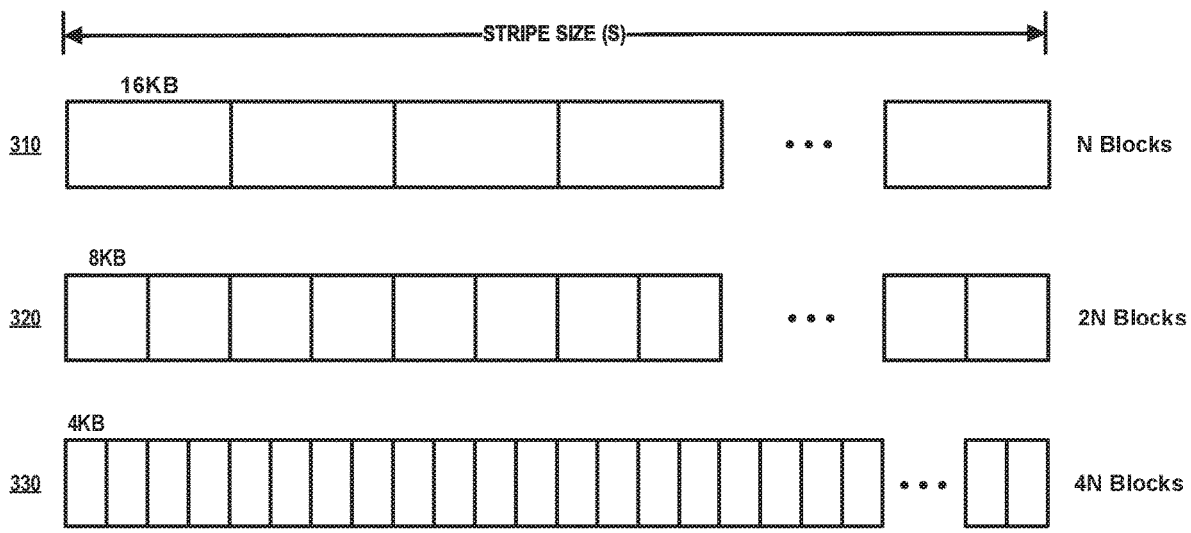

US 11,314,416 B1

DEFRAGMENTATION OF STRIPED VOLUME IN DATA STORAGE SYSTEM

TECHNICAL FIELD

This disclosure relates generally to storage systems and, more specifically, to techniques for managing striped storage volumes in a data storage system.

BACKGROUND

Distributed storage systems are implemented using a plurality of storage devices (e.g., storage arrays). The storage devices can reside locally in a given storage node, or the storage devices can reside on multiple storage nodes that are networked connected via a storage fabric. Various techniques are utilized in distributed data storage systems to provide resiliency and error correction to protect stored data in the event of failures of storage devices or storage nodes. For example, such techniques include erasure coding techniques and RAID (Redundant Array of Independent Drives) techniques. In general, RAID is a technology that is utilized to enhance the performance and reliability of data storage. There are various RAID levels which implement different combinations of techniques such as data mirroring, data striping, parity, etc., to provide fault tolerance and allow missing data to be recovered or otherwise reconstructed in the event of a failure of a storage device such as a hard disk drive (HDD), a solid-state drive (SSD), etc.

Over time, a storage volume such as a striped RAID storage volume can become fragmented to a level which begins to have an adverse impact on performance of the storage system. For example, one way to achieve a lower average input/output (I/O) overhead for writing to a RAID 6 volume is to perform as many full stripe writes as possible, which becomes increasingly difficult when the free capacity of the striped array runs low or becomes highly fragmented, resulting in a smaller number of empty full stripes to perform full stripe writes. To enhance the storage performance, a stripe defragmentation process can be performed to defragment the striped storage volume and generate empty stripes. However, defragmenting a striped storage volume such as a parity-based RAID storage volume can result in degraded system performance given that defragmentation is extremely I/O intensive especially in a shared storage system where a storage control system needs to allocate shared resources (e.g., cache, I/O channels, RAID controller activity) to accommodate the intensive I/O load generated as a result of the read and write operations of the defragmentation process. Moreover, for RAID storage volumes, degraded storage system performance can result from the operations associated with recomputing parity stripes and performing internal metadata updates on multiple levels, etc.

SUMMARY

Exemplary embodiments of the disclosure include techniques for defragmenting a striped storage volume in an array of data storage devices of a storage system. For example, an exemplary embodiment includes a method that is performed by a storage control system. The storage control system generates a striped storage volume in an array of data storage devices of a data storage system. The striped storage volume comprises a plurality of stripe sets, wherein each stripe set is associated with a different stripe type, wherein each stripe set includes stripes that are assigned the stripe type associated with the stripe set, and wherein the stripe type represents a block size of the stripes that are included in the stripe set. The storage control system performs a background stripe defragmentation process to defragment one or more stripes in a target stripe set and generate empty stripes. The storage control system adds the empty stripes generated by the background stripe defragmentation process into an empty stripe set of the striped storage volume, wherein the empty stripes in the empty stripe set have unassigned stripe types. The storage control system assigns a stripe type to an empty stripe in the empty stripe which is selected for removal from the empty stripe set and inclusion in the stripe set associated with the stripe type assigned to the empty stripe.

Other embodiments of the disclosure include, without limitation, methods, systems, and articles of manufacture comprising processor-readable storage media, which are configured for defragmenting a striped storage volume in an array of data storage devices of a storage system.

BRIEF DESCRIPTION OF THE DRAWINGS

FIGS. 3A and 3B schematically illustrate a striped logical storage volume having a plurality of stripe sets, wherein each stripe set is associated with a different stripe type to store blocks of a respective block size, according to an exemplary embodiment of the disclosure.

DETAILED DESCRIPTION

Exemplary embodiments of the disclosure will now be discussed in further detail with regard to systems and methods for defragmenting a striped storage volume in an array of data storage devices of a storage system, according to an exemplary embodiment of the disclosure. For purposes of illustration, exemplary embodiments will be described herein with reference to exemplary information processing systems which implement data processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
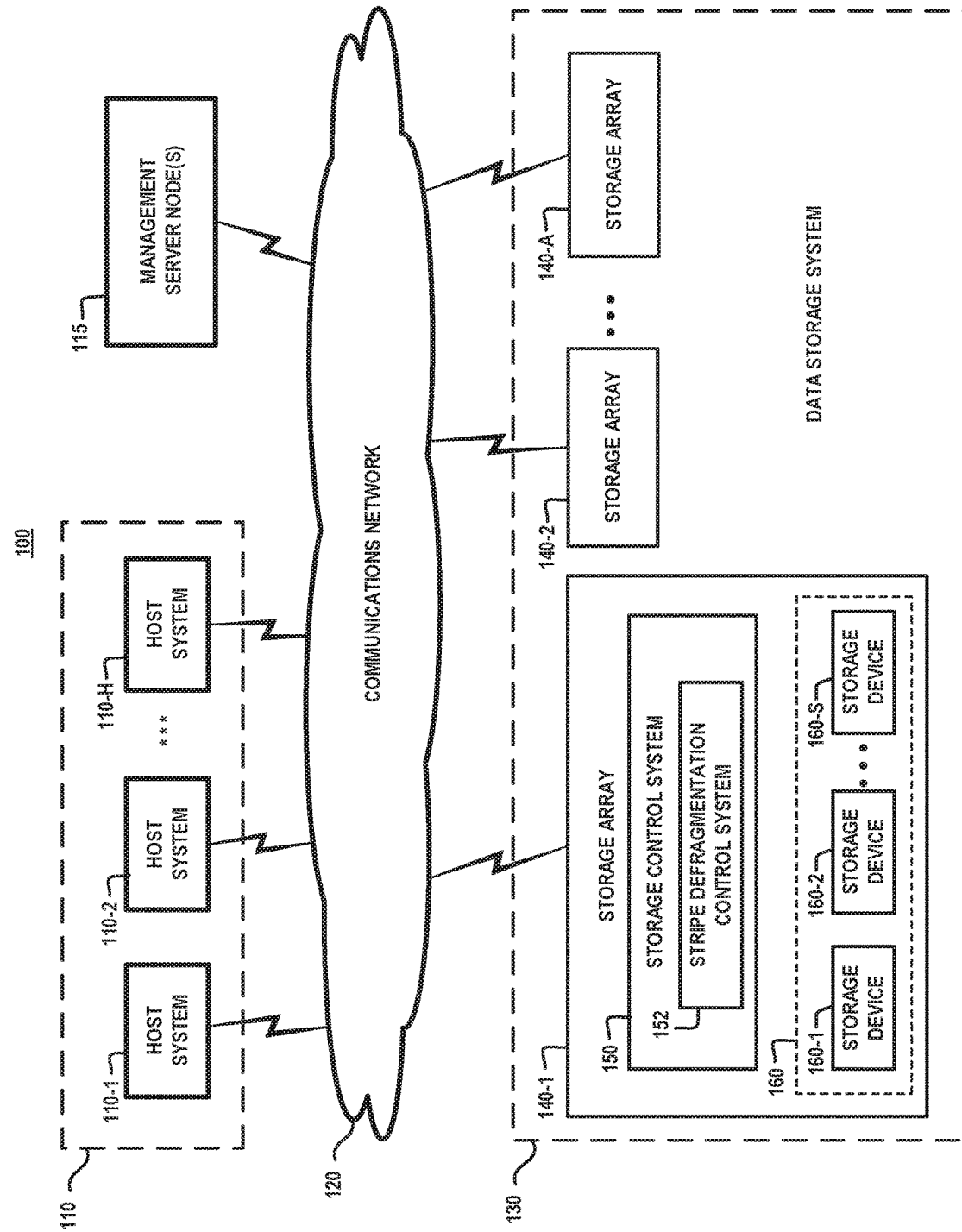
FIG. 1 schematically illustrates an information processing system comprising a storage system which is configured to defragment a striped storage volume in an array of data storage devices of the storage system, according to an exemplary embodiment of the disclosure.

FIG. 1 schematically illustrates an information processing system comprising a storage system which is configured to defragment a striped storage volume in an array of data storage devices of the storage system, according to an exemplary embodiment of the disclosure. In particular, FIG. 1 schematically illustrates an information processing system 100 which comprises one or more host systems 110-1, 110-2, . . . 110-H (collectively, host systems 110), one or more management server nodes 115, a communications network 120, and a data storage system 130. The data storage system 130 comprises one or more storage arrays 140-1, 140-2, . . . , 140-A (collectively, storage arrays 140). As further illustrated in FIG. 1, the storage array 140-1 comprises a storage control system 150, and a plurality of storage devices 160-1, 160-2, . . . , 160-S (collectively, storage devices 160). The storage control system 150 comprises a stripe defragmentation control system 152 which implements methods that are configured to defragment striped storage volumes that are stored in the storage devices 160 in one or more of the storage arrays 140 using techniques as discussed in further detail below. The storage control system 150 implements other functional components and modules to provide various functions as will be discussed in further detail below, for example, in conjunction with the exemplary embodiment of FIG. 2.

The host systems 110 comprise physical nodes and/or virtual nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). The host systems 110 can include one or more physical server nodes and/or virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in one or more of the storage arrays 140 and (ii) read requests to access data that is stored in one or more of the storage arrays 140.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a distributed data storage system comprising a cluster of the storage arrays 140-1, 140-2, . . . , 140-A, wherein each storage array 140 comprises the same or similar components as the storage array 140-1 shown in FIG. 1. In such embodiments, the addition of more storage arrays allows for scale-out in both performance and capacity of the data storage system 130. In other embodiments, the data storage system 130 may comprise a single storage array (e.g., storage array 140-1), wherein scale-up of capacity can be realized by adding additional storage devices to the storage array. It is to be noted that the storage array 140-1 and its associated storage devices 160 are an example of what is more generally referred to herein as a "storage system."

In some embodiments, each storage array 140 (or storage system) comprises a physical server machine or storage appliance comprising processors and other hardware resources that execute software and firmware to implemented the functionality of the storage control system 150, and wherein the storage devices 160 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). In some embodiments, the storage devices 160 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices.

These and various combinations of multiple different types of storage devices 160 may be implemented in each storage array 140. In this regard, the term "storage device" as used herein is intended to be broadly construed, so as to encompass, for example, SSDs, HDDs, flash drives, hybrid drives or other types of storage media. The storage control system 150 communicates with the data storage devices 160 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

The management server nodes 115 implement application programming interfaces (APIs) to enable manual, automated, and/or semi-automated configuration, provisioning, and monitoring the data storage system 130 and associated storage arrays 140. In some embodiments, the management server nodes 115 comprises stand-alone dedicated management server nodes, which may comprise physical and/or virtual servers that are configured to control operations of the data storage system 130.

The host systems 110 and management server nodes 115 communicate with the data storage system 130 over the communications network 120. While the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

In some embodiments, the storage arrays 140 of the data storage system 130 are interconnected (via the communications network 120) in a full-mesh network, wherein back-end interconnectivity between the storage control systems 150 of the storage arrays 140 is achieved using, e.g., a redundant high-speed InfiniBand fabric (e.g., 40 Gbps InfiniBand). In some embodiments, the storage arrays 140 utilized remote procedure calls (RPC) for control messages and remote direct memory access (RDMA) for moving data blocks. In some embodiments, the host systems 110 and management server nodes 115 communicate with the storage arrays 140 in a SAN configuration using Ethernet iSCSI and/or Fibre Channel connectivity protocols over the communications network 120.

On each storage array 140, the storage control system 150 comprises a combination of hardware, firmware, and software resources, which are configured to perform various functions including, but not limited to, (i) managing and executing data access requests issued by the host systems 110, (ii) performing various data management and storage services, and (iii) controlling network communication and connectivity, etc. In embodiments where the data storage system 130 comprises a cluster of multiple storage arrays 140, the storage control systems 150 of the storage array cluster will communicate in a cooperative manner to process each data access request received from the host systems 110.

Figure 2:
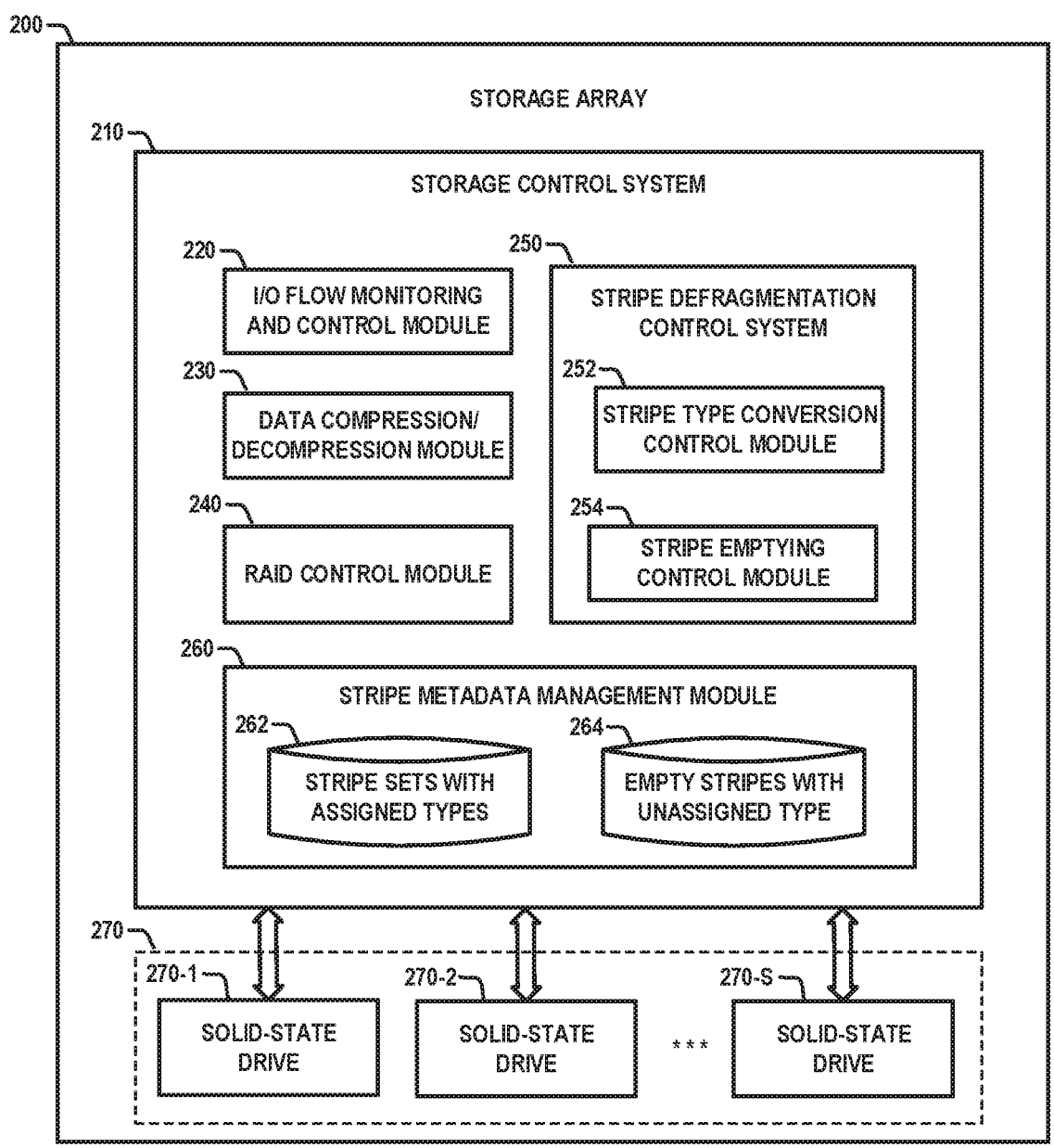
FIG. 2 schematically illustrates a storage system which comprise a storage control system that is configured to defragment a striped storage volume in an array of data storage devices of the storage system, according to an exemplary embodiment of the disclosure.

FIG. 2 schematically illustrates a storage system which comprise a storage control system that is configured to defragment a striped storage volume in an array of data storage devices of the storage system, according to an exemplary embodiment of the disclosure. More specifically, FIG. 2 schematically illustrates an exemplary framework of a storage array 200 which can be implemented for the storage arrays 140 in the data storage system 130 of FIG. 1. The storage array 200 (alternatively referred to as storage system 200) comprises a storage control system 210 which comprises a front-end I/O flow monitoring and control module 220, a data compression/decompression module 230, a RAID control module 240, a stripe defragmentation control system 250, and a stripe metadata management module 260. The stripe defragmentation control system 250 comprises a stripe type conversion control module 252 (alternatively referred to herein as a "converter defragmentation" control module) and a stripe emptying control module 254 (alternatively referred to herein as an "emptying defragmentation" control module). The stripe metadata management module 260 generates and manages data structures that are configured to manage metadata for stripe sets having stripes with assigned stripe types 262, and metadata for an empty stripe set having empty stripes with unassigned stripe types 254.

The storage array 200 further comprises an SSD drive array enclosure 270 comprising a plurality of solid-state drives 270-1, 270-2, . . . , 270-S (collectively referred to as SSD array 270, or more generally array of storage devices 270). The SSD array 270 can be coupled to the storage control system 210 using redundant interconnects that are implemented using any suitable standard interface such as SAS, SATA, PCI-Express, etc. In some embodiments, each solid-state drive 270-1, 270-2, . . . , 270-S comprises a plurality of flash memory chips, which are typically organized in an interleaved manner and accessed by the storage controller using different dedicated channels to enable parallel access to data. For example, an SSD controller can be connected to 4 flash memory chips using four parallel channels, whereby data transfer and read or write operations can be performed on different flash memory chips simultaneously. Each flash memory chip includes a plurality of dies which share a multiplexed interface (e.g., serial I/O bus). Each die comprises an array of memory cells that are grouped into a plurality of blocks, wherein each block comprises a plurality of pages. Typically, the blocks of each die are divided/organized into multiple planes (e.g., 2 or 4 planes), wherein each plane comprises a portion of the total number blocks. By way of example, each die can have a total of 4096 blocks organized among 2 planes of 2048 blocks. The dies can operate independently and perform operations involving one or two planes. Furthermore, in some embodiments, each physical block comprises a same number of pages (e.g., typically 64, 128, or 256 pages). Each page has a same page size, wherein common pages sizes include 2 KB, 4 KB, 8 KB, or 16 KB. In some embodiments, each die further comprises registers (e.g., data register, cache register), wherein each register has a same size as the page size of the pages. In addition, each page can include a dedicated region to store metadata such as identification and error-detection information.

As is known in the art, solid-state storage media such as NAND flash media allows data to be written or read on a page level, but does not allow existing data to be overwritten. In particular, while data can be written to an empty page, a page with existing data cannot be overwritten. Instead, a given block of flash memory must first be erased (E) before any new pages can be written (programmed P) to the given block. By way of example, if given programmed page of data of a given block has to be modified, the following process must be performed: (i) the page data of the entire block (i.e., valid pages of the block) is read into a temporary memory (e.g., a block located in over-provisioned capacity); (ii) an erase operation is performed to delete the existing data of the given block; (iii) a programming operation is performed to rewrite the previous data of the block plus the updated page content to the block, thereby resulting in the new block contents being programmed to the same block address. Furthermore, with NAND flash memory, free space can be created by reclaiming blocks of flash memory which include pages with stale (invalid) data using a "garbage collection" or defragmentation process.

The front-end I/O flow monitoring and control module 220 (alternatively referred to herein as choker control module 220) is comprises an intelligent "choker" control module which implements a dynamic flow-control mechanism that operates to adjust the system load in a way that ensures the maximum I/O performance can be achieved with the storage system 200 while guaranteeing a reasonable latency (within defined limits). The choker control module 220 is implemented at the frontend of the storage system 200 where I/O requests enter the system storage system 200. In some embodiments, the front-end I/O flow monitoring and control module 220 maintains at least two latency thresholds, including a low_latency_threshold and a high_latency_threshold, to determine whether to increase or decrease a "choker size." For example, in an illustrative embodiment, the high_latency_threshold may be, e.g., 1000 microseconds, and the low_latency_threshold may be, e.g., 700 microseconds.

The front-end I/O flow monitoring and control module 220 monitors and queues incoming I/O requests, measures the end-to-end I/O latency, and then adjusts a "choker size" based on the measured I/O latency compared to the low_latency_threshold and the high_latency_threshold values. For example, the "choker size" may be a threshold number of pages, sectors, or blocks, a threshold number of bytes, or a threshold number of I/O requests that may be processed concurrently by the storage system. The choker control module 220 controls the number of concurrent I/O requests the storage system 200 will handle. This control mechanism ensures that the storage system 200 will perform within target operating range based on the low and high latency threshold values, and prevent uncontrolled latency growth. When the maximum number of I/O requests is reached, new incoming I/Os are placed in queue for processing, or may be rejected (e.g., returning BUSY to the host). As explained in further detail below, feedback from the I/O flow monitoring and control module 220 is utilized by the storage control system 210 to regulate a background defragmentation process that is performed by the stripe defragmentation control system 250 for defragmenting a striped storage volume that is implemented on, e.g., the SSD array 270.

The data compression and decompression module 230 comprises a data compression module that is configured to support in-line compression of data that is written to the array of storage devices 270, and a data decompression module that is configured to support in-line decompression of compressed data that is read from the array of storage devices 270. In particular, the data compression module implements one or more types of data compression techniques to compress I/O write data that is provided with an I/O write request. In some embodiments, for a write I/O operation, the associated I/O write data is divided into blocks, and each block is separately compressed by the data compression module. In some embodiments, the compressed data blocks can be grouped into blocks with block sizes that are less than or equal to an "allocation unit size" before being written to the array of storage devices 270.

The data compression module can implement one more data compression techniques including, but not limited to, Lempel-Ziv (LZ) compression, Lempel-Ziv-Welch (LZW) compression, other variants of LZ compression, Huffman encoding, run-length encoding, etc., and other types of data compression techniques which are suitable for the expected types of data that are to be stored for a given application. The data decompression module is configured to decompress compressed data that is read from the array of storage devices 270 in response to I/O read requests. In particular, when compressed data is accessed from the array of storage devices 270, the compressed data is input to the data decompression module and decompressed using a decompression process which corresponds to the process that was used to compress the data. The decompressed data is then returned in response to the I/O read request.

In some embodiments, the data compression and decompression module 230 can implement a compressibility determination module that is configured to determine the "compressibility" of data that is to be written to the array of storage devices 270. With regard to a given block of I/O write data, the term "compressibility" as used herein broadly refers to (i) a level of data compression that can be obtained for the given block of I/O write data or (ii) a degree to which a size of the given block of I/O write data can be reduced by data compression. The compressibility determination can be implemented based on the understanding that not all data is compressible. For example, when data compression is performed on data that is essentially incompressible, the size of the resulting "compressed" data may be the same or greater than the size of the original, non-compressed data. For example, incompressible data can include pre-compressed content (e.g. compressed audio and video), or pure random data. In such instance, the data that is deemed to be incompressible can be stored in its originally received form (which may or may not already be compressed or otherwise encoded).

The RAID control module 240 implements methods that are configured to distribute, organize, and manage data across multiple storage device in the array 270 to implement a RAID array according to a given RAID level configuration (e.g., RAID 1, RAID 5, RAID 6, etc.). In some embodiments, the RAID control module 240 is configured to manage a striped logical storage volume (e.g., striped RAID volume) across a plurality of local storage devices 270 of the storage system 200, and possibly other local storage devices of one or more storage systems within a given cluster (e.g., storage devices of different storage arrays 140 of the data storage system 130 of FIG. 1). In such instance, the RAID control module 240 cooperates with the RAID control modules of other storage arrays within a cluster to implement a RAID array which comprises a plurality of storage devices (e.g., solid-state drives 270) across different storage arrays. In some embodiments, the RAID control module 240 comprises a software module of the storage control system 210, in which the RAID functionality is executed using the operating system and existing hardware of the host storage system 200.

The RAID control module 240 is configured to control and manage the organization of data in a given RAID array using RAID storage techniques such as striping, mirroring, parity, and combinations thereof, depending on the given RAID level configuration. In particular, the RAID control module 240 implements data striping methods that are configured to support RAID schemes which implement data striping techniques to distribute data over a plurality of storage devices. In particular, the data striping methods are configured to divide data into resiliency units called "stripes" and divide the stripes into equal-sized data blocks, referred to as "strips," wherein the strips are stored on different storage devices (e.g., different solid-state drives 270) within the RAID array. In addition, the RAID control module 240 implements parity computing methods that are configured to support parity-based RAID schemes. The parity computing methods are configured to compute parity data (for, e.g., data stripes) using one or more types of parity functions (e.g., eXclusive OR (XOR) function, etc.). The types of parity functions that are implemented will depend on the RAID level configurations that are supported by the RAID control module 240. The RAID control module 240 implements methods for rebuilding of spare capacity in the event of one or more failures of a given RAID array (e.g., failure of a single solid-state drive in the given RAID array, or failure of a given storage array which includes a solid-state drive that is implemented in the given RAID array, etc.).

The RAID control module 240 is configured to implement different types of RAID levels (e.g., RAID 5, RAID 6, etc.) which utilize a combination of block level data striping and distributed parity techniques to provide resiliency and error correction in the event of a failure (e.g., failure of a given storage device within a RAID array, the failure of a storage system node which hosts a storage device within the RAID array, etc.). In accordance with exemplary embodiments of the disclosure, the RAID control module 240 generates and manages one or more striped logical volumes that are associated with RAID configurations. The RAID control module 240 defines a plurality of different "stripe types" for stripes that are stored in a striped logical volume. The term "stripe type" as used herein denotes a block size (or stripe size, segment size, etc.) of a stripe having the given stripe type. More specifically, in some embodiments, stripes having different stripe types are equal-sized stripes, but wherein each stripe type is structured to store blocks of a specific size. In other words, stripes having the same stripe type are formed of blocks that are the same size, while different types of stripes are formed of blocks having different sizes. It is to be understood that the term "stripe" as used herein refers to suitable type of storage unit, including, but not limited to, RAID stripes. In this regard, although exemplary embodiments are discussed herein in the context of RAID arrays and RAID stripes, it should be understood that the exemplary embodiments for defragmenting striped logical storage volumes is not limited to any specific type of storage technology.

FIGS. 3A and 3B schematically illustrate a striped logical storage volume having a plurality of stripe sets, wherein each stripe set is associated with a different stripe type to store blocks of a respective block size, according to an exemplary embodiment of the disclosure. In particular, FIG. 3A schematically illustrates a striped logical storage volume 300 comprising a plurality of different sets of stripes 300-1, 300-2, 300-3, and 300-4 (alternatively referred to as "stripe sets"). In some embodiments, the striped logical storage volume 300 comprises a logical RAID volume. Each stripe set 300-1, 300-2, and 300-3 comprises stripes that are formed of blocks having the same size. For example, the first stripe set 300-1 comprises one or more stripes that are assigned a first stripe type (e.g., STRIPE_TYPE_16 KB) wherein the stripes within the first stripe set 300-1 are formed of blocks of a first size (e.g., 16 KB). The second stripe set 300-2 comprises one or more stripes that are assigned a second stripe type (e.g., STRIPE_TYPE_8 KB) wherein the stripes within the second stripe set 300-2 are formed of blocks of a second size (e.g., 8 KB). The third stripe set 300-3 comprises one or more stripes that are assigned a third stripe type (e.g., STRIPE_TYPE_4 KB) wherein the stripes within the third stripe set 300-3 are formed of blocks of a third size (e.g., 4 KB).

In other embodiments, although not specifically shown in FIG. 3A, a striped logical storage volume can include other stripe sets that are assigned different stripe types. For example, the striped logical storage volume 300 can have a fourth stripe set which comprises one or more stripes that are assigned a fourth stripe type (e.g., STRIPE_TYPE_64 KB) wherein the stripes within the fourth stripe set are formed of blocks of a fourth size (e.g., 64 KB). In addition, the striped logical storage volume 300 can have a fifth stripe set which comprises one or more stripes that are assigned a fifth stripe type (e.g., STRIPE_TYPE_2 KB) wherein the stripes within the fifth stripe set are formed of blocks of a fifth size (e.g., 2 KB). It is to be understood that the number of different stripe types assigned to stripe sets will vary depending on the desired granularity of the storage system, the types of data or files (e.g., text files, pictures, video, etc.) expected to be stored in the storage system, and other factors as is understood by those of ordinary skill in the art. Moreover, while the different block sizes are can be defined based on powers of 2, it is to be understood that exemplary embodiments can include other block sizes, e.g., 3 KB, or other suitable sizes.

The stripe metadata management module 260 generates and manages the metadata 262 for the different stripe sets (e.g., stripe sets 300-1, 300-2, and 300-3) having stripes with assigned stripe types. For example, the metadata 262 for each stripe set can include, e.g., identifiers for the stripes within the stripe set that are assigned the same stripe type, a block count regarding a number of free blocks or number of utilized blocks within each stripe in the stripe set, metadata regarding a total amount of free storage space within all stripes in the stripe set, and a total amount of used space within all stripes in the stripe set, etc. Such metadata can be utilized, for example, to determine which stripes have sufficient free space to store data associated with an I/O write request, to determine whether or not the storage capacities of the different stripe sets are sufficient balanced or unbalance, etc.

As further shown in FIG. 3A, the striped logical storage volume 300 comprises a set of empty stripes 300-4 (alternatively referred to as "empty stripe set" 300-4) which comprises one or more empty stripes (no stored data blocks) which do not have assigned stripe types. As explained in further detail below, the empty stripe set 300-4 comprises one or more empty stripes that are generated during a background defragmentation process (referred to herein as an "emptying defragmentation process") in which fragmented data stripes in one or more of the stripe sets 300-1, 300-2, and 300-3 are selected for defragmentation to generate empty stripes that are added to the empty stripe set 300-4.

The empty stripes within the empty stripe set 300-4 do not have assigned stripe types, but rather are prepared during the background defragmentation process (during off-peak hours, or periods of low I/O activity, without negatively impacting the performance of the storage system) to provide a pool of available empty stripes (with unassigned stripe types) that can be utilized during peak hours (e.g., periods of high I/O activity) to select free stripes within the empty stripe set 300-4 and assign stripe types to the selected free stripes for inclusion in one or more of the stripe sets 300-1, 300-2, and 300-3 to thereby provide additional storage capacity and balance free capacity of the different stripe sets 300-1, 300-2, and 300-3. It is to be understood that at any given time, one or more of the different stripe sets 300-1, 300-2, and 300-3, can have any number of zero or more empty stripes which are not currently utilized, but which empty stripes nevertheless have assigned stripe types. The stripe metadata management module 260 generates and manages the metadata 254 associated with an empty stripe set (e.g., empty stripe set 300-4) having empty stripes with unassigned stripe types.

In some embodiments, while different types of stripes have different block sizes, all stripes are equal-sized stripe irrespective of the assigned stripe types. For example, FIG. 3B schematically illustrates different stripes 310, 320, and 330, which are included in respective stripe sets 300-1, 300-2, and 300-3. Each stripe 310, 320, and 330 has the same stripe size (s) despite having different block sizes corresponding the assigned stripe types. For example, the first stripe 310 with the assigned stripe type of STRIPE_TYPE_16 KB is configured to store N blocks of size 16 KB, the second stripe 320 with the assigned stripe type of STRIPE_TYPE_8 KB is configured to store 2N blocks of size 8 KB, and the third stripe 330 with the assigned stripe type STRIPE_TYPE_4 KB is configured to store 4N blocks of size 4 KB.

In some embodiments, when the striped logical storage volume 300 is initially configured, the storage control system 210 (e.g., the RAID control module 240) divides and allocates the physical storage capacity (e.g., different storage devices in RAID array) associated with the striped logical storage volume 300 among the different stripe sets 300-1, 300-2, and 300-3 so that each stripe set 300-1, 300-2, and 300-3 is initially configured to have an allocated amount of empty (free) stripes with associated stripe type assignments. For example, assume a RAID array that is logically configured to have plurality of columns (K) and a plurality of rows (N), wherein each column K represents a different solid-state drive and k=24 with 22 columns to store data strips and 2 columns to store two different parity strips (e.g., P and Q) for a RAID 6 configuration.

Furthermore, assuming 30 rows are allocated for a first set of stripes with an assigned stripe type 16 KB, then on each drive (i.e. column) (except for the two parity columns) the first set of stripes would have a total amount of available data blocks (16 KB each) equal to 22×30=660 data blocks, providing a total storage capacity of 660×16 KB. Next, assuming there are 60 rows allocated for a second set of stripes with an assigned stripe type 8 KB, then on each drive (i.e. column) (except for the two parity columns) the second set of stripes would have a total amount of available data blocks (8 KB each) equal to 22×60=1320 data blocks, providing a total storage capacity of 1320×8 KB. Moreover, assuming there are 120 rows allocated for a third set of stripes with an assigned stripe type 4 KB, then on each drive (i.e. column) (except for the two parity columns) the third set of stripes would have a total amount of available data blocks (4 KB each) equal to 22×120=2640 data blocks, providing a total storage capacity of 2640×4 KB.

Figure 4:
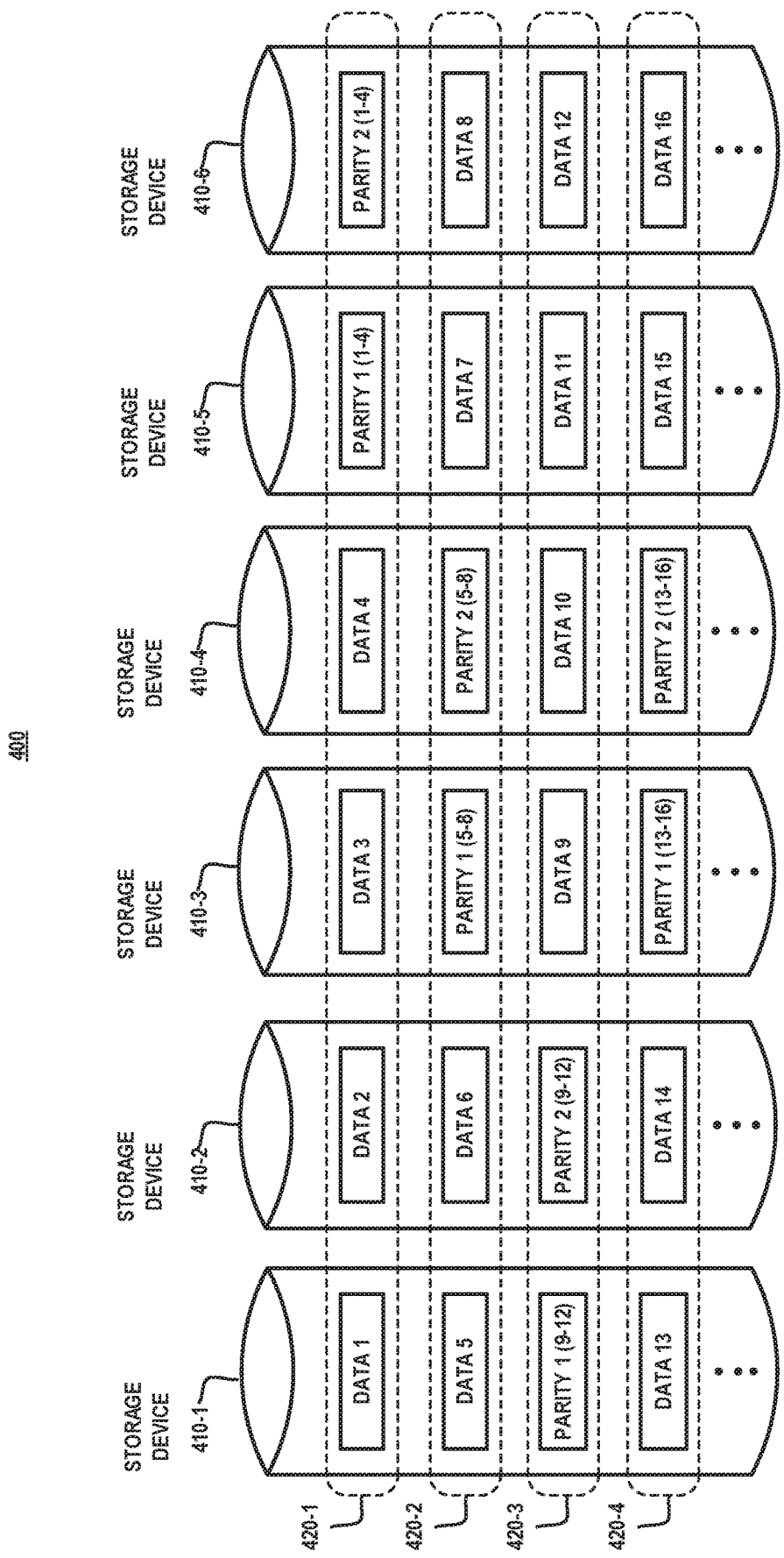
FIG. 4 schematically illustrates a RAID 6 configuration which can be implemented in the data storage systems of FIGS. 1 and 2, according to an exemplary embodiment of the disclosure.

For example, FIG. 4 schematically illustrates a RAID 6 configuration 400 which can be implemented in the data storage systems of FIGS. 1 and 2, according to an exemplary embodiment of the disclosure. In particular, as shown in FIG. 4, the RAID 6 configuration 400 comprises six storage devices 410-1, 410-2, 410-3, 410-4, 410-5, and 410-6 (collectively, storage devices 410). In some embodiments, in the context of the exemplary embodiment of FIG. 2, each storage device 410-1, 410-2, 410-3, 410-4, 410-5, and 410-6 comprises a different solid-state drive within the SSD array 270 of the storage array 220. In other embodiments, each storage device 410-1, 410-2, 410-3, 410-4, 410-5, and 410-6 comprises a different solid-state drive 270 within two or more storage arrays within a cluster. The RAID 6 configuration 400 can be implemented to protect user data and some system metadata. The RAID 6 configuration 400 is organized in grids data blocks, with N rows and K columns. As noted above, each column is a separate physical solid-state drive, where 4 data columns are used to store data strips, and two columns are used to store associated parity data strips, e.g., PQ parity data, wherein the parity data strips P are computed, for example, by performing logical XOR operations across the data columns, and wherein parity data strips Q are computed by encoding diagonals in the matrix of stripes.

In the exemplary embodiment of FIG. 4, for ease of illustration, four individual RAID 6 stripes 420-1, 420-2, 420-3, and 420-4 are shown, wherein each RAID stripe 420-1, 420-2, 420-3, and 420-4 comprises 4 data strips and 2 parity strips. In particular, the RAID stripe 420-1 comprises four data strips DATA 1, DATA 2, DATA 3, and DATA 4, and two independent parity strips PARITY 1 and PARITY 2 for the data strips DATA (1-4). The RAID stripe 420-2 comprises four data strips DATA 5, DATA 6, DATA 7, and DATA 8, and two independent parity strips PARITY 1 and PARITY 2 for the data strips DATA (5-8). The RAID stripe 420-3 comprises four data strips DATA 9, DATA 10, DATA 11, and DATA 12, and two independent parity strips PARITY 1 and PARITY 2 for the data strips DATA (9-12). The RAID stripe 420-4 comprises four data strips DATA 13, DATA 14, DATA 15, and DATA 16, and two independent parity strips PARITY 1 and PARITY 2 for the data strips DATA (9-12).

While FIG. 4 illustrates an exemplary RAID 6 layout for the data blocks and parity data blocks, different RAID 6 layout schemes can be implemented which specify different orders and locations in which the constituent data blocks (strips) and associated parity data blocks for the data blocks (stripes) are written to the storage devices 410-1, 410-2, 410-3, 410-4, 410-5, and 410-6 within the RAID 6 configuration 400. The RAID configuration 400 provide resiliency and data protection in the event a maximum of two failures of the storage devices.

In the exemplary embodiment of FIG. 4, assuming that the number of data blocks N for the stripe 310 in FIG. 3B is N=4, then in the exemplary embodiment of FIG. 4, each individual RAID stripe 420-1, 420-2, 420-3, and 420-4 would represent a separate stripe in the first stripe set 300-1 (FIG. 4A). Assuming that the number of data blocks 2N for the stripe 320 in FIG. 3B is 2N=8, then in the exemplary embodiment of FIG. 4, the two RAID stripes 420-1 and 420-2 would represent one stripe in the second stripe set 300-2 (FIG. 4A), and the two RAID stripes 420-3 and 420-4 would represent another stripe in the second stripe set 300-2. Further, assuming that the number of data blocks 4N for the stripe 330 in FIG. 3B is 4N=16, then in the exemplary embodiment of FIG. 4, the four RAID stripes 420-1, 420-2, 420-3 and 420-4 would collectively represent a single stripe in the third stripe set 300-3 (FIG. 4A).

As noted above, the storage system 200 implements an efficient data reduction method by utilizing the data compression and decompression module 230 to compress incoming data pages and stores the compressed data pages in one or more stripes (e.g., RAID stripes) of a striped storage volume (e.g., RAID 6 storage volume) based on the size of the compressed data pages. For example, if a data page is compressed to 3 KB and the stripe type with the closest block size to 3 KB is 4 KB then it will be stored in a stripe of type STRIPE_TYPE_4 KB. The system divides the storage capacity to the different types of stripes at initialization, and the stripes gets filled according to the compressed size of the written data pages. This pose a problem in instance where, e.g., all data pages are compressed to 15 KB and are therefore stored in stripes of type STRIPE_TYPE_16 KB. At some point, all stripes within the stripe set having the assigned stripe type STRIPE_TYPE_16

KB will become full such that the storage system will not be able to write any new data despite the fact that there may be free space in the storage capacity allocated to data stripes in other stripes sets with different stripe types.

The stripe defragmentation control system 250 is configured to balance the free capacity of the different stripe sets of different stripe types by performing defragmentation operations to generate empty stripes. The stripe defragmentation control system 250 utilizes the stripe emptying control module 254 to perform a background defragmentation process that is responsible to ensure that stripe type has a proportional amount of available capacity (e.g., balance capacity on stripe counts for the different stripe types). When the stripes (e.g., RAID stripes) of a given storage volume (e.g., RAID 6 storage volume) are fragmented and there are no empty stripes, the system performance can be significantly degraded, since a defragmentation operation increases write amplification and requires additional I/O bandwidth on the array of storage devices to perform the defragmentation operations. The performance impact is especially increased and noticeable during peak hours of increased I/O activity when the storage system is under a heavy I/O load. On the other hand, the storage system is not always 100% loaded. It has peak hours and off-peak hours (e.g. at night) in which the system resources are not 100% utilized and are essentially idle.

In this regard, the stripe emptying control module 254 is configured to perform a background stripe defragmentation process to prepare empty stripes with unassigned stripe types. The background stripe defragmentation process is activated during off-peak hours to minimize or eliminate any adverse impact on the storage system performance, to prepare empty stripes that are to be used during peak hours and thereby improve the system performance. For example, as noted above, the stripe emptying control module 254 defragments stripes in one or more stripe sets to generate empty stripes that are included within the set of empty stripes with unassigned stripe types 200-4 (FIG. 3A). The background defragmentation process is performed to ensure that each stripe set for each stripe type has a proportional amount of available capacity.

The background defragmentation process converts a stripe (which is included in a stripe set of a given stripe type) to an empty stripe by (i) emptying the stripe by writing all its blocks to other stripes of the same type, and (ii) updating the corresponding metadata which points to the physical location of the moved data blocks. Once the stripe is emptied (i.e., all blocks were written to other stripes and all metadata is updated), the background defragmentation process will add the empty stripe to the set of empty stripes with an unassigned stripe type 200-4 (FIG. 3A). In this regard, the empty stripes with unassigned stripe types which are generated in the background during periods of low I/O activity of the storage system 200, prepared for subsequent use and assigned given stripe type, on demand, during write allocation.

The stripe type conversion control module 252 monitors the free capacity of the different stripe sets of different stripe types, and whenever there is a capacity disbalance among the stripe sets, the stripe type conversion control module 252 can select one or more empty stripes with unassigned stripe types and convert the selected empty stripes to stripe of a given stripe type for inclusion is a stripe set that has a shortage of free capacity. The stripe type conversion control module 252 operates at any time during peak hours when the storage system is fully or highly utilized, or even during off peak hours when the storage system I/O load is light, to convert empty stripes with unassigned types to stripes with assigned types. Since the stripe type conversion process does not require a complicated defragmentation operation (such as the stripe emptying process) involving excessing storage device I/Os, parity recalculations, internal metadata updates on multiple levels, the stripe conversion process implemented by the stripe type conversion control module 252 does not adversely impact system performance.

The activation of the stripe emptying control module 254 to perform stripe emptying defragmentation operations during off-peak hours, and periods of low I/O activity, significantly reduces the required system resources and improves system performance despite the defragmentation and stripe emptying workload. The stripe defragmentation and emptying operations performed by the stripe emptying control module 254 to prepare empty stripes with unassigned stripe types can be performed in parallel with the stripe type conversion operations performed by the stripe type conversation control module 252. The stripe defragmentation and emptying operations can be performed even when the capacities of the stripe sets of different stripe types are balanced and the stripe type conversation control module 252 is idle.

In some embodiments, the operation and activity (e.g., start, stop, workload throttle, intensity (number of defragmentation threads), etc.) of the stripe emptying control module 254 to prepare empty stripes with unassigned stripe types is regulated by the front-end I/O flow monitoring and control module 220 to ensure that the stripe defragmentation and emptying operations are performed during off-peak hours or periods of low I/O workload of the storage system, to prepare empty stripes for allocation and stripe assignment during peak hours. Indeed, as noted above, given that the stripe defragmentation and emptying operations are complicated operations that involve excessive disk I/Os, parity recalculations, internal metadata updates on multiple levels, the operation and activity is regulated and controlled by feedback from the frontend I/O flow monitoring and control module 220.

For example, the operation and level of activity (e.g., start, stop, workload intensity, etc.) will be regulated based on feedback from the front-end choker control module 220. The main idea is to control the workload intensity of the stripe defragmentation and emptying operations of the stripe emptying control module 254 so that the control module 254 is activated at time when there are under-utilized system resources, with minimal impact on the system performance. In some embodiments, the stripe emptying control module 254 will receive I/O latency information from the frontend I/O flow monitoring and control module 220 and adjust or throttle its workload intensity based on the received I/O latency information.

In some embodiments, a I/O latency interval of the I/O flow monitoring and control module 220 is divided into multiple regions, wherein the regions may be, or may not be, equal in range. For example, the latency interval may be divided into different regions as follows: a low region (e.g., 0%-30%), an intermediate region (e.g., 30%-85%), a high region (e.g., 85%-95%), and a very high region (e.g., 95%-100%). The workload intensity of stripe defragmentation and emptying operations of the stripe emptying control module 254 will be set for each region. The exact intensity level will be tuned so that it has minimal impact on the I/O latency. For example, in the "low" region, the stripe emptying control module 254 will be activated with a maximum intensity (maximum number of threads). In the intermediate region, the stripe emptying control module 254 will be activated with a 60% intensity level. In the high region, the stripe emptying control module 254 will operate with a 20% intensity level. In the very high region, the operations of the stripe emptying control module 254 are completely suspended/paused. This process enables efficient utilization of the system resources during off-peak hours in order to achieve an improved performance on peak hours.

The I/O latency feedback information generated by the frontend I/O flow monitoring and control module 220, and utilized by the stripe emptying control module 254 can be pushed to the stripe emptying control module 254 on a regular basis (e.g., periodically based on time, change in I/O latency, etc.). In other embodiment, the I/O latency feedback information can be pulled from the I/O flow monitoring and control module 220 by the stripe emptying control module 254 periodically querying the I/O flow monitoring and control module 220 based on, e.g., time. When the stripe emptying control module 254 is activated, it may query frontend I/O flow monitoring and control module 220 more frequently, in order to detect for an increase in the I/O latency due to its operation, and adjust its intensity accordingly.

Figure 5:
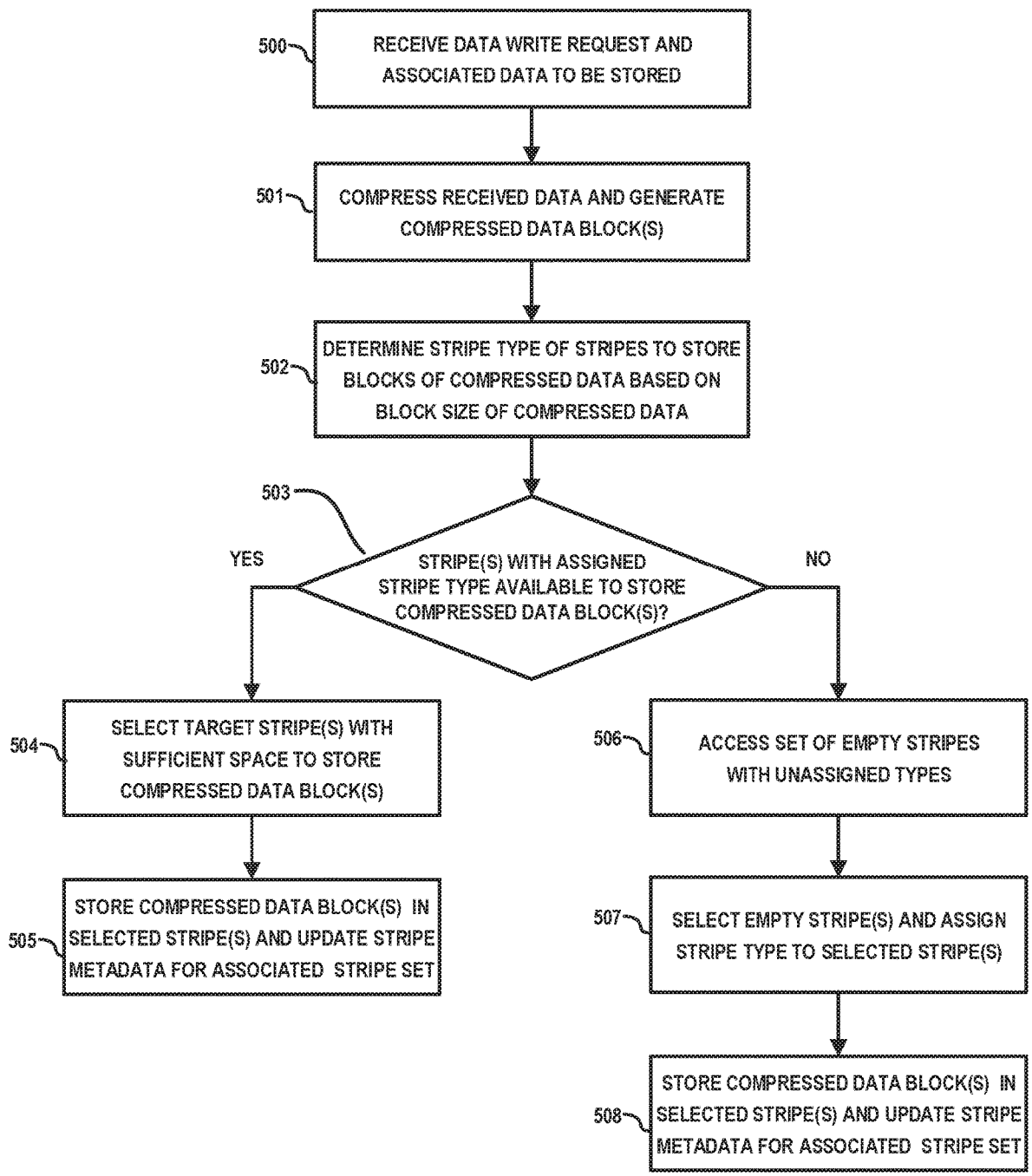
FIG. 5 is a flow diagram of a method for storing data to a striped storage volume having different types of stripes sets, according to an exemplary embodiment of the disclosure.

FIG. 5 is a flow diagram of a method for storing data to a striped storage volume having different types of stripes sets, according to an exemplary embodiment of the disclosure. In some embodiments, FIG. 5 illustrate modes of operation of the storage control system 210 and the RAID control module 240 of FIG. 2 and, thus, for illustrative purposes, the process flow of FIG. 5 will be discussed in the context of the exemplary embodiment of the storage system 200 of FIG. 2. The storage control system receives a data write request and associated data to be stored (block 500). The storage control system will pass the write data to the in-line data compression system to compress the write data and generate compressed data blocks (block 501).

The storage control system will determine a stripe type of stripes to use for storing the compressed data blocks to the striped storage volume based on the block size of the compressed data (block 502). The storage control system will determine if there are available stripes having the assigned stripe types for the determined stripe type (block 503). If stripes with the assigned stripe type are available (affirmative determination in block 503), the storage system will select one or more target stripes in the stripe set for the assigned stripe type which have sufficient space (e.g., empty blocks) to store the compressed data blocks (block 504). The compressed data blocks are stored in the selected stripes and the metadata 262 for the associated stripe set with the assigned stripe type is updated based on the write operation (block 505).

On the other hand, if stripes with the assigned stripe type are not available (negative determination in block 503), the storage control system will access the set of empty stripes with unassigned stripe types 300-4, FIG. 3A (block 506) and select one or more empty stripes as needed to store the compressed data blocks and assign a stripe type to the selected empty stripes (block 507). The storage control system will then proceed to store the compressed data blocks in the selected stripes and update the stripe metadata for the associated stripe set to reflect the added stripe(s) to the stripe set (block 508).

Figure 6:
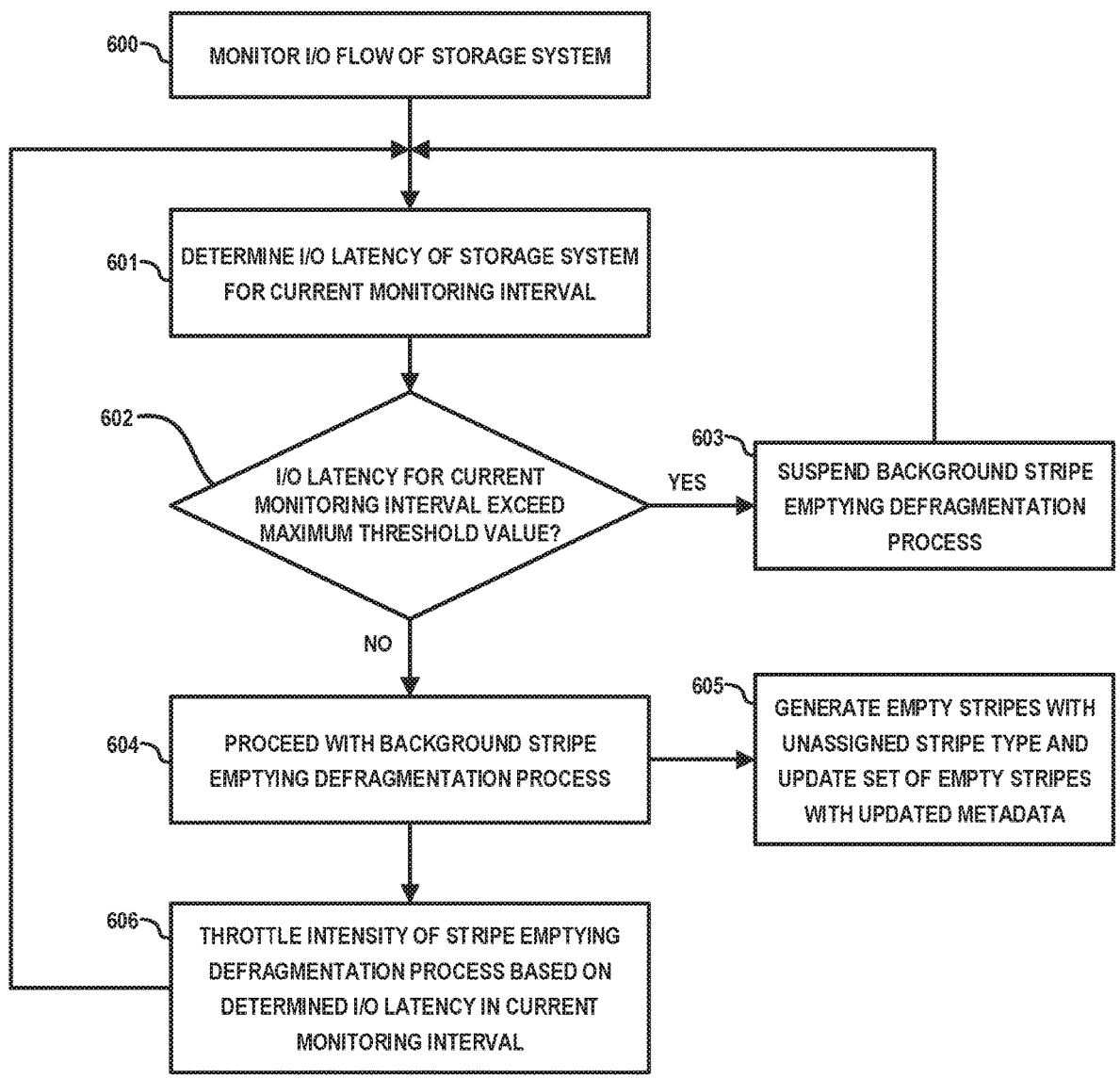
FIG. 6 is a flow diagram of a method for utilizing feedback from an I/O flow monitoring and control system of a storage system to regulate a background defragmentation process for defragmenting a striped storage volume of the storage system, according to an exemplary embodiment of the disclosure.

FIG. 6 is a flow diagram of a method for utilizing feedback from an I/O flow monitoring and control system of a storage system to regulate a background defragmentation process for defragmenting a striped storage volume of the storage system, according to an exemplary embodiment of the disclosure. In some embodiments, FIG. 6 illustrate modes of operation of the frontend I/O flow monitoring and control module 220 and the stripe defragmentation control system 250 of the storage control system 210 of FIG. 2 and, thus, for illustrative purposes, the process flow of FIG. 6 will be discussed in the context of the exemplary embodiment of the storage system 200 of FIG. 2. The frontend I/O flow monitoring and control module 220 monitors the I/O flow of the storage system to periodically determine an I/O latency of the storage system in each monitoring interval (block 600). In some embodiments, a monitoring interval may be on the order of several seconds, for example, 5, 10, or 15 seconds, or minutes, etc. During each monitoring interval, the frontend I/O flow monitoring and control module 220 can determine an I/O latency as average end-to-end I/O latency and/or a peak end-to-end I/O latency of the storage system. The end-to-end latency may be determined as an elapsed time for I/O requests to be completed by storage system.

The frontend I/O flow monitoring and control module 220 determines an I/O latency for a current monitoring interval (block 601) and compares the determined I/O latency with a maximum I/O latency threshold value (block 602). If the determined I/O latency for the current monitoring interval is determined to exceed the maximum I/O latency threshold value (affirmative determination in block 602), a background stripe emptying defragmentation process will be suspended (block 603). In this instance, the stripe emptying control module 254 may be operating in the background to defragment stripes in one or more stripe sets to generate empty stripes with unassigned stripe types. The stripe defragmentation and emptying operations will be suspended with the I/O latency of the storage system meets or exceeds the predefined maximum I/O latency threshold value to ensure that the performance of the storage system is not degraded due to such defragmentation and stripe emptying operations.

On the other hand, if the determined I/O latency for the current monitoring interval is determined to not exceed the maximum I/O latency threshold value (negative determination in block 602), the stripe emptying control module 254 will activate or otherwise continue performing a background stripe emptying defragmentation process (block 604) to defragment stripes in one or more stripe sets and generate empty stripes with unassigned stripe types (block 605). The intensity (e.g., number of workload threads) of the background stripe emptying defragmentation process will be throttled based on the determined I/O latency in the current monitoring interval (block 606).

Figure 7:
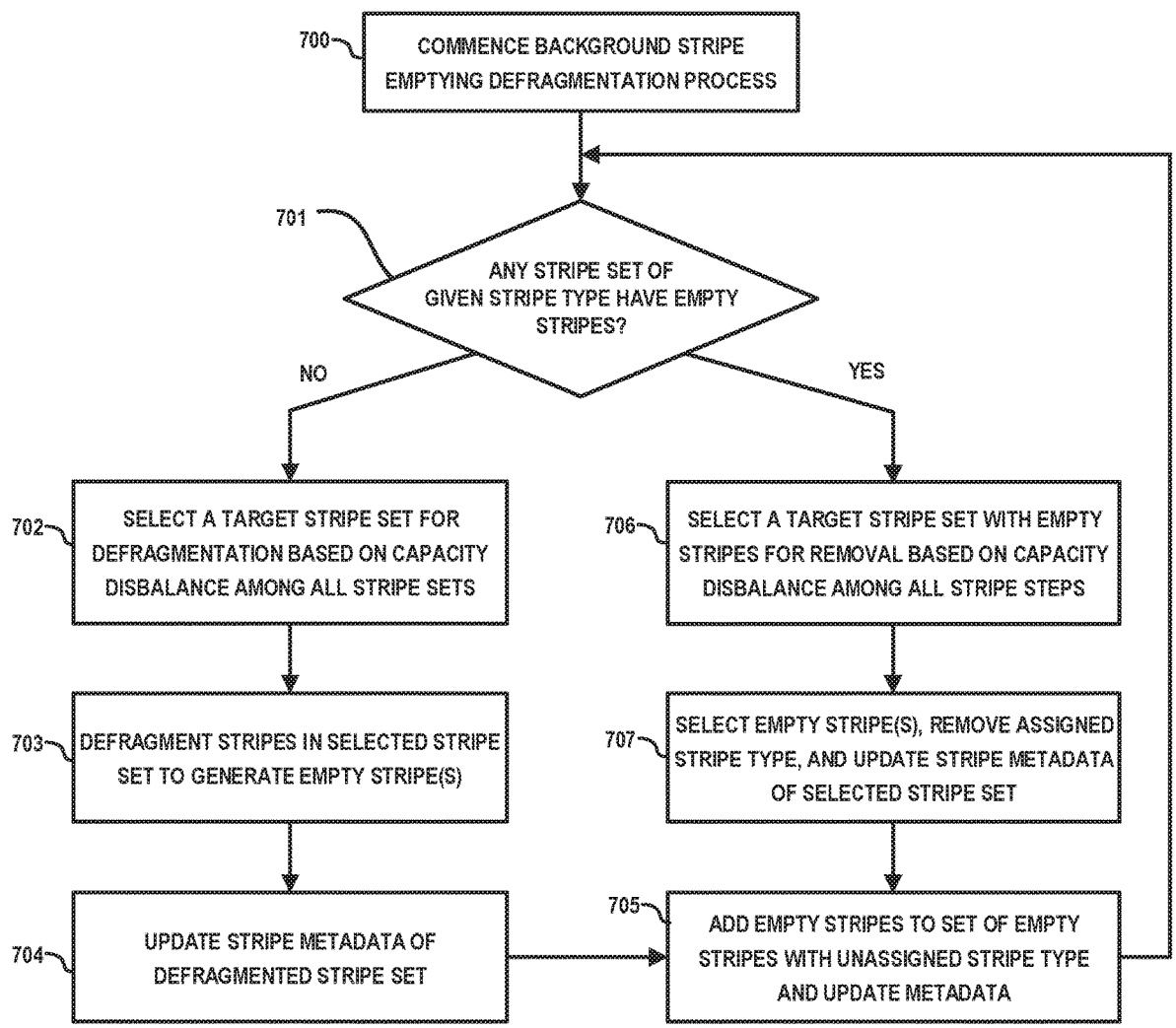
FIG. 7 is a flow diagram of a background defragmentation process for defragmenting a striped storage volume of a storage system to generate empty stripes with an unassigned stripe types, according to an exemplary embodiment of the disclosure.

FIG. 7 is a flow diagram of a background defragmentation process for defragmenting a striped storage volume of a storage system to generate empty stripes with an unassigned stripe type, according to an exemplary embodiment of the disclosure. In some embodiments, FIG. 7 illustrate modes of operation of the stripe emptying control module 254 of the storage control system 210 of FIG. 2 and, thus, for illustrative purposes, the process flow of FIG. 7 will be discussed in the context of the exemplary embodiment of the storage system 200 of FIG. 2. The stripe emptying control module 254 commences a background stripe emptying defragmentation process (block 700). The stripe emptying control module 254 will utilize the stripe set metadata 262 to determine if any stripe set has empty stripes (block 701).

If it is determined that no stripe sets have an empty stripe (negative determination in block 701), the stripe emptying control module 254 will utilize the stripe set metadata 262 to select a target stripe set for defragmentation based on a capacity disbalance among all the different type stripe sets (block 702). The stripe emptying control module 254 will defragment one or more stripes in the selected stripe set to generate one or more empty stripes (block 703) and then update the metadata associated with the defragmented stripe set (block 704). The stripe emptying control module 254 will add the one or more empty stripes to empty stripe set with unassigned stripe types (300-4, FIG. 3A) and update the empty stripe set metadata 264 accordingly (block 705).

On the other hand, if it is determined that one or more stripe sets have one or more empty stripes (affirmative determination in block 701), the stripe emptying control module 254 will utilize the stripe set metadata 262 to select a target stripe set to remove one or more empty stripes (i.e., unassign stripe type) from the target stripe set based on a capacity disbalance among all the different type stripe sets (block 706). The stripe emptying control module 254 will select one or more empty stripes, remove the assigned stripe type for the selected stripes, and then update the stripe set metadata to indicate the selected stripes are no longer included in the target stripe set (block 707). The stripe emptying control module 254 will add the one or more empty stripes to empty stripe set with unassigned stripe types (300-4, FIG. 3A) and update the empty stripe set metadata 264 accordingly (block 705).

Figure 8:
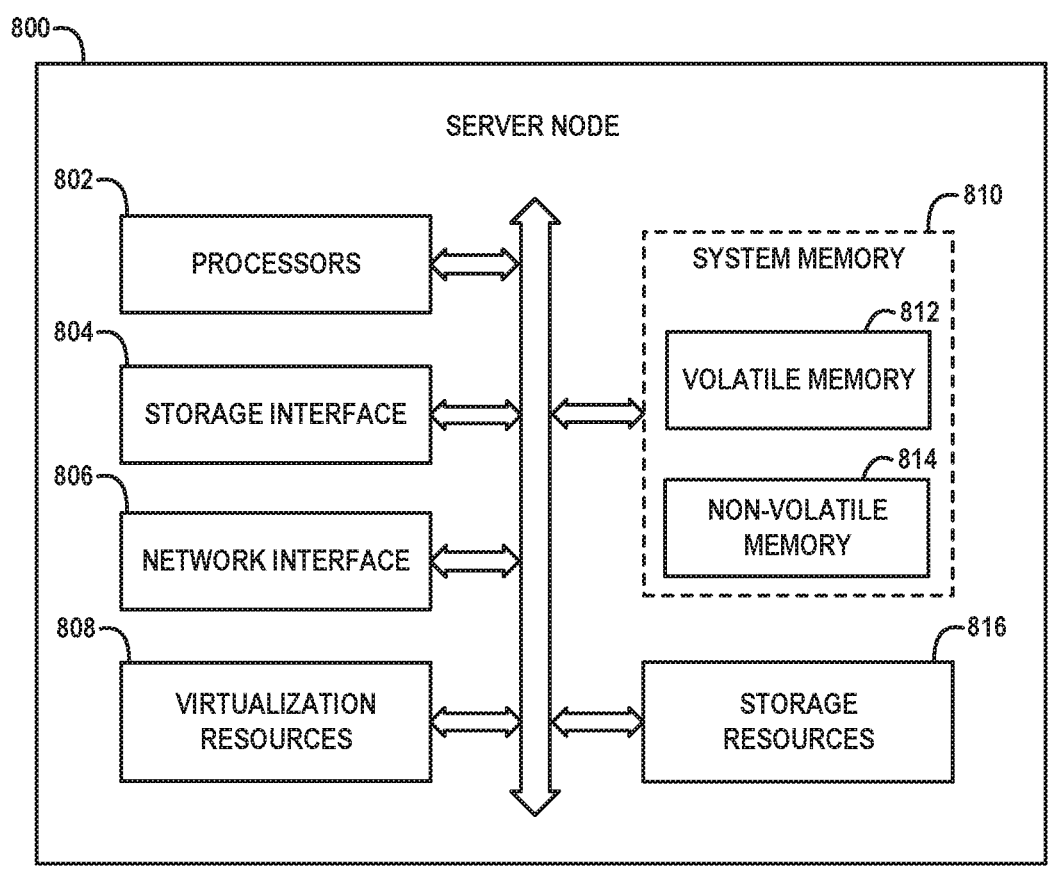
FIG. 8 schematically illustrates a framework of a server node which can host a storage system having a storage control system that is configured to defragment a striped storage volume in an array of data storage devices of the storage system, according to an exemplary embodiment of the disclosure.

FIG. 8 schematically illustrates a framework of a server node which can host a data storage system that is configured to implement automated adaptive endurance tuning of solid-state storage media, according to an exemplary embodiment of the disclosure. The server node 800 comprises processors 802, storage interface circuitry 804, network interface circuitry 806, virtualization resources 808, system memory 810, and storage resources 816. The system memory 810 comprises volatile memory 812 and non-volatile memory 814. The processors 802 comprise one or more types of hardware processors that are configured to process program instructions and data to execute a native operating system (OS) and applications that run on the server node 800.

For example, the processors 802 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 804 enables the processors 802 to interface and communicate with the system memory 810, the storage resources 816, and other local storage and off-infrastructure storage media, using one or more standard communication and/or storage control protocols to read data from or write data to volatile and non-volatile memory/ storage devices. Such protocols include, but are not limited to, NVMe, PCIe, PATA, SATA, SAS, Fibre Channel, etc. The network interface circuitry 806 enables the server node 800 to interface and communicate with a network and other system components. The network interface circuitry 806 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 808 can be instantiated to execute one or more service or functions which are hosted by the server node 800. For example, the virtualization resources 808 can be configured to implement the various modules and functionalities of the storage control system 210 (FIG. 2) as discussed herein. In one embodiment, the virtualization resources 808 comprise virtual machines that are implemented using a hypervisor platform which executes on the server node 800, wherein one or more virtual machines can be instantiated to execute functions of the server node 800. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 800, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 808 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 800 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of, e.g., storage control system 210 (FIG. 2), comprise program code that is loaded into the system memory 810 (e.g., volatile memory 812), and executed by the processors 802 to perform respective functions as described herein. In this regard, the system memory 810, the storage resources 816, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 810 comprises various types of memory such as volatile RAM, NVRAM, or other types of memory, in any combination. The volatile memory 812 may be a dynamic random-access memory (DRAM) (e.g., DRAM DIMM (Dual In-line Memory Module), or other forms of volatile RAM. The non-volatile memory 814 may comprise one or more of NAND Flash storage devices, SSD devices, or other types of next generation non-volatile memory (NGNVM) devices. The system memory 810 can be implemented using a hierarchical memory tier structure wherein the volatile system memory 812 is configured as the highest-level memory tier, and the non-volatile system memory 814 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 802 to execute a native operating system and one or more applications or processes hosted by the server node 800, and to temporarily store data that is utilized and/or generated by the native OS and application programs and processes running on the server node 800. The storage resources 816 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
    generating, by a storage control system, a striped storage volume in an array of data storage devices of a data storage system, wherein the striped storage volume comprises a plurality of stripe sets, wherein each stripe set is assigned a different stripe type, wherein each stripe set includes stripes that are assigned the same stripe type that is assigned to the stripe set, wherein the stripe type assigned to a given stripe set specifies a same block size of data blocks within the stripes that are included in the given stripe set, and wherein the stripes with different stripe types have respective different block sizes;
    performing, by the storage control system, a background stripe defragmentation process to defragment one or more stripes in a target stripe set and generate empty stripes;
    adding, by the storage control system, the empty stripes generated by the background stripe defragmentation process into an empty stripe set of the striped storage volume, wherein the empty stripes in the empty stripe set have unassigned stripe types; and
    assigning, by the storage control system, a stripe type to an empty stripe in the empty stripe which is selected for removal from the empty stripe set and inclusion in the stripe set associated with the stripe type assigned to the empty stripe.

2. The method of claim 1, wherein performing the background stripe defragmentation process comprises throttling, by the storage control system, an amount of a stripe defragmentation workload performed by the background stripe defragmentation process based at least in part on an input/output (I/O) load of the data storage system.

3. The method of claim 2, wherein throttling the amount of the stripe defragmentation workload performed by the background stripe defragmentation process comprises:
    periodically determining, by the storage control system, a current I/O load of the data storage system in each of a plurality of monitoring intervals; and
    providing, by the storage control system, the current I/O load of the data storage system determined in each of the monitoring intervals as feedback to the background stripe defragmentation process to periodically adjust the amount of the stripe defragmentation workload performed by the background stripe defragmentation process.

4. The method of claim 2, further comprising determining, by the storage control system, the I/O load of the data storage system as a function of an I/O latency of I/O requests that are received and processed by the data storage system.

5. The method of claim 1, further comprising suspending, by the storage control system, the background stripe defragmentation process in response to determining that an input/output (I/O) load of the data storage system exceeds a predefined maximum threshold value.

6. The method of claim 1, wherein the stripes of the plurality of stripes sets have a same stripe size.

7. The method of claim 1, wherein the plurality of stripes sets comprises at least one or more of (i) a first stripe set which comprises one or more stripes that are assigned a first stripe type in which the stripes are formed of blocks with a block size of 16 KB, (ii) a second stripe set which comprises one or more stripes that are assigned a second stripe type in which the stripes are formed of blocks with a block size of 8 KB, and (iii) a third stripe set which comprises one or more stripes that are assigned a third stripe type in which the stripes are formed of blocks with a block size of 4 KB.

8. The method of claim 1, wherein the striped storage volume comprises a RAID storage volume.

9. An article of manufacture comprising a non-transitory processor-readable storage medium having stored therein program code of one or more software programs, wherein the program code is executable by one or more processors to implement a method which comprises:

generating, by a storage control system, a striped storage volume in an array of data storage devices of a data storage system, wherein the striped storage volume comprises a plurality of stripe sets, wherein each stripe set is assigned a different stripe type, wherein each stripe set includes stripes that are assigned the same stripe type that is assigned to the stripe set, wherein the stripe type assigned to a given stripe set specifies a same block size of data blocks within the stripes that are included in the given stripe set, and wherein the stripes with different stripe types have respective different block sizes;

performing, by the storage control system, a background stripe defragmentation process to defragment one or more stripes in a target stripe set and generate empty stripes;

adding, by the storage control system, the empty stripes generated by the background stripe defragmentation process into an empty stripe set of the striped storage volume, wherein the empty stripes in the empty stripe set have unassigned stripe types; and assigning, by the storage control system, a stripe type to an empty stripe in the empty stripe which is selected for removal from the empty stripe set and inclusion in the stripe set associated with the stripe type assigned to the empty stripe.

10. The article of manufacture of claim 9, wherein the program code for performing the background stripe defragmentation process comprises program code that is executable by the one or more processors to implement a method which comprises throttling, by the storage control system, an amount of a stripe defragmentation workload performed by the background stripe defragmentation process based at least in part on an input/output (I/O) load of the data storage system.

11. The article of manufacture of claim 10, wherein the program code for throttling the amount of the stripe defragmentation workload performed by the background stripe defragmentation process comprises program code that is executable by the one or more processors to implement a method which comprises:

periodically determining, by the storage control system, a current I/O load of the data storage system in each of a plurality of monitoring intervals; and providing, by the storage control system, the current I/O load of the data storage system determined in each of the monitoring intervals as feedback to the background stripe defragmentation process to periodically adjust the amount of the stripe defragmentation workload performed by the background stripe defragmentation process.

12. The article of manufacture of claim 11, further comprising program code that is executable by the one or more processors to implement a method which comprises determining, by the storage control system, the I/O load of the data storage system as a function of an I/O latency of I/O requests that are received and processed by the data storage system.

13. The article of manufacture of claim 9, further comprising program code that is executable by the one or more processors to implement a method which comprises suspending, by the storage control system, the background stripe defragmentation process in response to determining that an input/output (I/O) load of the data storage system exceeds a predefined maximum threshold value.

14. The article of manufacture of claim 9, wherein the stripes of the plurality of stripes sets have a same stripe size.

15. The article of manufacture of claim 9, wherein the plurality of stripes sets comprises at least one or more of (i) a first stripe set which comprises one or more stripes that are assigned a first stripe type in which the stripes are formed of blocks with a block size of 16 KB, (ii) a second stripe set which comprises one or more stripes that are assigned a second stripe type in which the stripes are formed of blocks with a block size of 8 KB, and (iii) a third stripe set which comprises one or more stripes that are assigned a third stripe type in which the stripes are formed of blocks with a block size of 4 KB.

16. The article of manufacture of claim 9, wherein the striped storage volume comprises a RAID storage volume.

17. A data storage system, comprising:

an array of data storage devices;

at least one processor; and a system memory configured to store program code, wherein the program code is executable by the at least one processor to implement a storage control system which is configured to:

generate a striped storage volume in the array of data storage devices, wherein the striped storage volume comprises a plurality of stripe sets, wherein each stripe set is assigned a different stripe type, wherein each stripe set includes stripes that are assigned the same stripe type that is assigned to the stripe set, wherein the stripe type assigned to a given stripe set specifies a same block size of data blocks within the stripes that are included in the given stripe set, and wherein the stripes with different stripe types have respective different block sizes;

perform a background stripe defragmentation process to defragment one or more stripes in a target stripe set and generate empty stripes;

add the empty stripes generated by the background stripe defragmentation process into an empty stripe set of the striped storage volume, wherein the empty stripes in the empty stripe set have unassigned stripe types; and assign a stripe type to an empty stripe in the empty stripe which is selected for removal from the empty stripe set and inclusion in the stripe set associated with the stripe type assigned to the empty stripe.

18. The data storage system of claim 17, wherein:

in performing the background stripe defragmentation process, the storage control system is configured to throttle an amount of a stripe defragmentation workload performed by the background stripe defragmentation process based at least in part on an input/output (I/O) load of the data storage system; and in throttling the amount of the stripe defragmentation workload performed by the background stripe defragmentation process, the storage control system is configured to:

periodically determine a current I/O load of the data storage system in each of a plurality of monitoring intervals; and provide the current I/O load of the data storage system determined in each of the monitoring intervals as feedback to the background stripe defragmentation process to periodically adjust the amount of the stripe defragmentation workload performed by the background stripe defragmentation process.

19. The data storage system of claim 18, wherein the storage control system is configured to determine the I/O load of the data storage system as a function of an I/O latency of I/O requests that are received and processed by the data storage system.

20. The data storage system of claim 17, wherein the storage control system is configured to suspend the background stripe defragmentation process in response to determining that an input/output (I/O) load of the data storage system exceeds a predefined maximum threshold value.

\* \* \* \* \*